United States Patent
Kangas (10) Patent No.: US 9,215,192 B2
(45) Date of Patent: Dec. 15, 2015

(54) METHOD AND APPARATUS FOR AN EXPANDABLE SWITCHING ELEMENT

(75) Inventor: Bradley Ronald Kangas, Saint Charles, IL (US)

(73) Assignee: Tellabs Operations, Inc., Naperville, IL (US)

(*) Notice: Subject to any disclaimer, the term of this patent is extended or adjusted under 35 U.S.C. 154(b) by 621 days.

(21) Appl. No.: 13/030,043

(22) Filed: Feb. 17, 2011

(65) Prior Publication Data

US 2012/0213229 A1    Aug. 23, 2012

(51) Int. Cl.
*H04L 12/28*    (2006.01)
*H04L 12/933*    (2013.01)
*H04L 12/46*    (2006.01)

(52) U.S. Cl.
CPC ........ *H04L 49/1515* (2013.01); *H04L 12/4625* (2013.01)

(58) Field of Classification Search
CPC .................................................. H04L 49/1515
USPC ......................................................... 370/400
See application file for complete search history.

(56) References Cited

U.S. PATENT DOCUMENTS

| | | | | |
|---|---|---|---|---|
| 4,999,832 | A * | 3/1991 | Chen et al. | 370/369 |
| 5,420,986 | A * | 5/1995 | Baldwin et al. | 370/452 |
| 7,139,266 | B2 * | 11/2006 | Li et al. | 370/360 |
| 7,440,448 | B1 * | 10/2008 | Lu et al. | 370/380 |
| 8,059,640 | B2 * | 11/2011 | Obara et al. | 370/388 |
| 8,223,759 | B2 * | 7/2012 | Beshai | 370/380 |
| 2008/0247387 | A1 * | 10/2008 | Neilson | 370/386 |
| 2010/0202460 | A1 * | 8/2010 | Park et al. | 370/394 |
| 2011/0262135 | A1 * | 10/2011 | Boduch et al. | 398/45 |

* cited by examiner

*Primary Examiner* — Robert Wilson
*Assistant Examiner* — Nourali Mansoury
(74) *Attorney, Agent, or Firm* — Hamilton, Brook, Smith & Reynolds, P.C.

(57) ABSTRACT

An embodiment of the invention may comprise pairing a first switching module with a second switching module such that the first switching module is enabled to switch signals received via its first input ports and its second input ports to its first output ports and second output ports, wherein the signals received by the first input ports of the first switching module are communicated from the first output ports of the second switching module, and the signals communicated by the first output ports of the second switching module are signals received by the second input ports of the second switching module and forwarded to the first output ports of the second switching module.

28 Claims, 8 Drawing Sheets

METHOD AND APPARATUS FOR AN EXPANDABLE SWITCHING ELEMENT

RELATED APPLICATIONS

None.

TECHNICAL FIELD

The present invention relates to switching elements, and more specifically, to a method and apparatus for an expandable switching element.

BACKGROUND

Switching devices are used to handle communication needs. Switches can range from telephone switches handling discrete voice circuits to optical switches handling information streams equivalent to millions of voice circuits or more. Typically, a switch is modular, where cabinets can be added on as need grows, and switching modules can be populated in the cabinets. The switching modules may be of different types, each with a different functionality. Accordingly, a switch may be populated and configured for a limited amount of traffic, and as traffic increases over time, more modules and/or cabinets can be added on. However, this reconfiguration may involve taking the switch out of service.

SUMMARY

Various embodiments of the invention may comprise methods and apparatus for expandable switching elements. An embodiment of the invention may comprise a module with first input ports and first output ports accessible via a module front panel, second input ports and second output ports accessible via connections on the module other than on the module front panel, and a switch element capable of switching signals received by the first input ports and the second input ports to the first output ports and the second output ports.

An embodiment of the invention may also comprise first switching modules enabled to communicate with second switching modules and third switching modules enabled to communicate with the second switching modules. A second switching module may be enabled to be paired with another second switching module via first input ports and first output ports of each of the pair of the second switching modules. One of the pair of the second switching modules may be configured to be an enhanced switching module that switches input signals received via its first input ports and its second input ports to its first output ports and its second output ports. The other of the pair of the second switching modules may be configured to be a forwarding module that connects input signals received via its first input ports to its second output ports and connects input signals received via its second input ports to its first output ports.

A method for configuring switching modules may comprise coupling first output ports of a first switching module with first input ports of a second switching module to allow communication from the first switching module to the second switching module. First output ports of the second switching module may be coupled with first input ports of the first switching module to allow communication from the second switching module to the first switching module. One of the first switching module and the second switching module may be configured as a forwarding module and the other of the first switching module and the second switching module may be configured as an enhanced switching module. The enhanced switching module may switch signals from its first input ports and its second input ports to its first output ports and its second output ports. The forwarding module may communicate signals from its second input ports to its first output ports and communicates signals from its first input ports to its second output ports. Accordingly, the forwarding module may be said to be configured, for example, in a layer 0 forwarding mode.

A method for configuring a switch may comprise pairing, in a stage of a multi-stage switch, a first switching module with a second switching module by coupling first output ports of the first switching module with first input ports of the second switching module to allow communication of first output signals to the second switching module. First output ports of the second switching module may be coupled with first input ports of the first switching module to allow communication of second output signals to the first switching module. One of the first switching module and the second switching module may be configured as a forwarding module, and the other of the first switching module and the second switching module may be configured as an enhanced switching module. The enhanced switching module may switch signals from its first input ports and its second input ports to its first output ports and its second output ports. The forwarding module may communicate signals from its second input ports to its first output ports and communicates signals from its first input ports to its second output ports.

DETAILED DESCRIPTION

A description of example embodiments of the invention follows. In the following description, for purposes of explanation, specific nomenclature is set forth to provide a thorough understanding of embodiments of the present invention. It will be apparent to one skilled in the art that specific details in the description may not be required to practice the embodiments of the present invention. Accordingly, well-known circuits, devices, and programs may be shown in block diagram form to avoid obscuring embodiments of the present invention unnecessarily.

Figure 1:
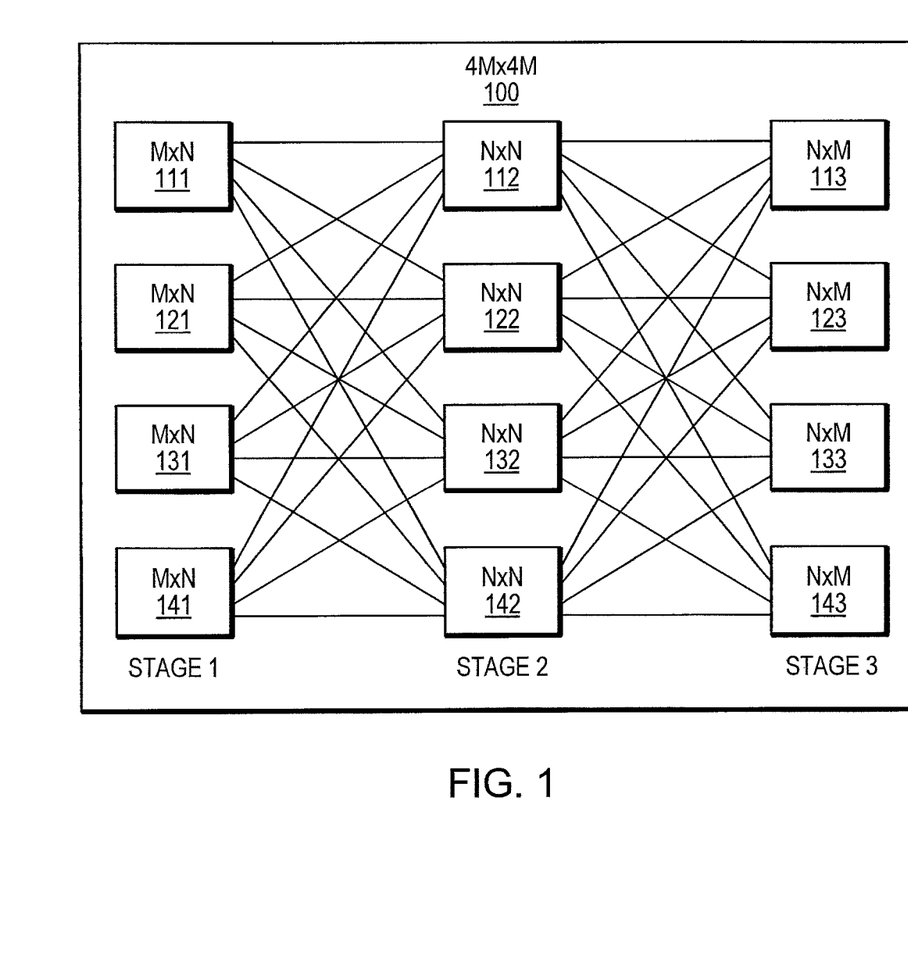
FIG. 1 illustrates an exemplary block diagram of a switch fabric that may be used in accordance with an embodiment of the invention.

FIG. 1 illustrates an exemplary block diagram of a switch fabric that may be used in accordance with an embodiment of the invention. Referring to FIG. 1, there is shown a multi-stage switch 100, such as, for example, a Clos switch. The switch 100 may be a 4M×4M switch with 4M inputs and 4M outputs. The switch 100 comprises switching modules 111, 121, 131, and 141 in stage 1, switching modules 112, 122, 132, and 142 in stage 2, and switching modules 113, 123, 133, and 143 in stage 3. In an exemplary Clos switch, each switching module 111, 121, 131, and 141 is a M×N switching module with M input ports and N output ports; each switching module 112, 122, 132, and 142 is a N×N switching module with N input ports and N output ports; and each switching module 113, 123, 133, and 143 is a N×M switching module with N input ports and M output ports. In description of various figures described below, M and N are set to '4' for exemplary purposes. However, M and/or N may be other number of inputs and/or outputs as applicable for a specific design/implementation of a switch.

Generally, a Clos switch may be designed to enable a signal from any input at stage 1 to be able to reach any output of stage 3. With respect to switch 100, each input port of the switching modules 111, 121, 131, and 141 in stage 1 may be coupled to a communication cable (not shown). The four output ports in each switching module 111, 121, 131, and 141 may then be coupled as shown to the four switching modules 112, 122, 132, and 142 in stage 2.

Similarly, each of the switching modules 112, 122, 132, and 142 in stage 2 may switch a signal at any input port to any of four output ports provided in each respective switching module 112, 122, 132, and 142. The four output ports in each switching module 112, 122, 132, and 142 may then be coupled to the four switching modules 113, 123, 133, and 143 in stage 3. Each output port of the switching modules 113, 123, 133, and 143 may be coupled to communication cables (not shown).

While each switching module in a stage is shown to be connected to all switching module in the next stage for exemplary purposes, various embodiments of the invention may use a configuration where a switching module may be connected to a subset of the switching modules in the next stage. However, to be consistent, all figures of the switching modules will be shown to be connected similarly as in FIG. 1.

Figure 2:
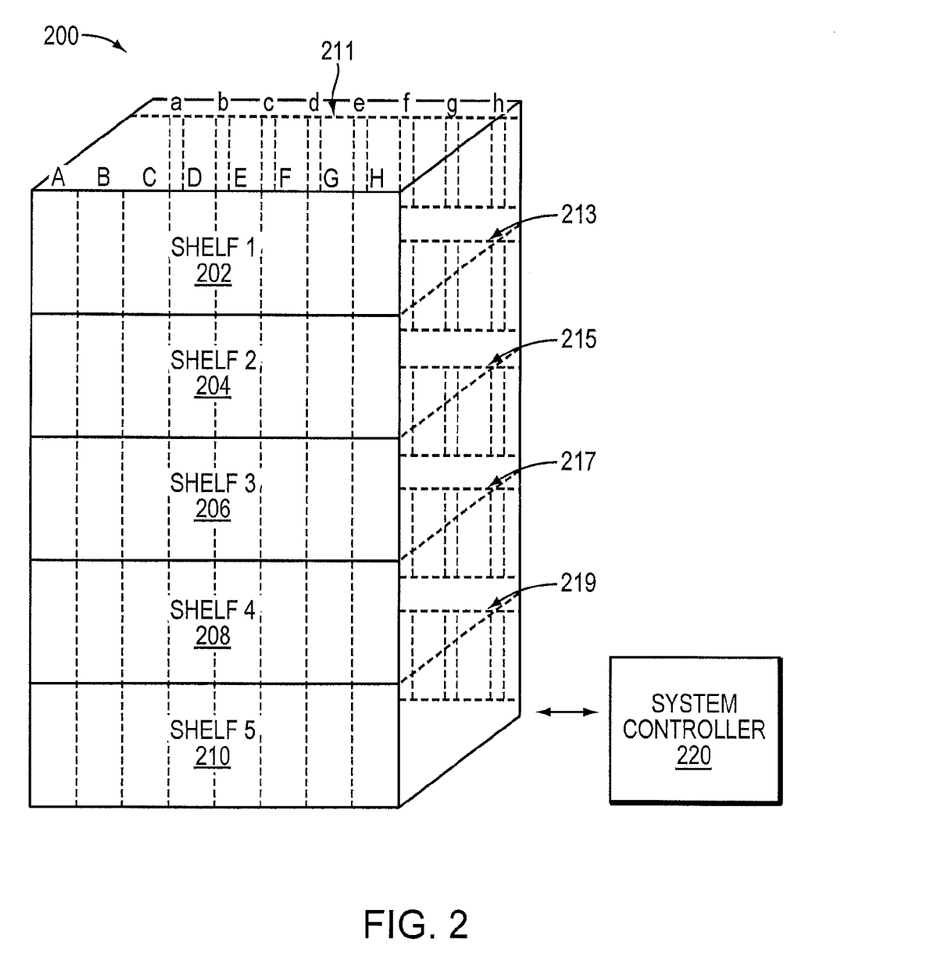
FIG. 2 illustrates an exemplary block diagram of a switch cabinet that may be used in accordance with an embodiment of the invention.

FIG. 2 illustrates an exemplary block diagram of a switch cabinet that may be used in accordance with an embodiment of the invention. Referring to FIG. 2, there is shown an exemplary cabinet 200 and a system controller 220. The cabinet 200 may be used to house various switching modules such as, for example, the switching modules 111, 112, . . . , 142, 143 shown in FIG. 1. The cabinet 200 may comprise a plurality of shelves 202, 204, 206, 208, and 210, and backplanes 211, 213. 215, 217, and 219, where there may be a backplane for each shelf, and each backplane may comprise connectors a, b, c, d, e, f, g, and h. The shelves 202, 204, 206, 208, 210 may each comprise a plurality of slots A, B, C, D, E, F, G, and H that may be adapted to receive modules of various functionality. At least some of these slots may be provisioned with, for example, switching modules. Each module may be slid in to a slot and received by a respective connector a, b, c, d, e, f, g, or h. The backplane may be different from shelf to shelf depending on functionality of the modules allowed for the shelves. Similarly, each backplane connector may be generally the same, or different from another backplane connector. A front panel of a module inserted in one of the slots A, B, C, D, E, F, G, or H may be at the end of the module opposite to the end received by the backplane connector. Front panel accessibility may be required where there is no backplane accessibility.

The number of shelves in a cabinet may vary according to design of the cabinet. Also, although the slots have been labeled A, B, C, D, E, F, G, and H, various embodiments of the invention may be used with cabinets having different number of slots per shelf, and the number of slots or available slots for modules on a given shelf need not be the same as for another shelf. For example, some slots on a shelf may be dedicated to power supplies for the cabinet, and therefore not available, for example, for switching modules. The backplanes 211, 213. 215, 217, and 219 and their respective connectors a, b, c, d, e, f, g, and h may be design and/or implementation specific for receiving one or more types of modules and/or providing electrical connectivity between slots. A module for a shelf may be received by a connector in the appropriate backplane. Cables (not shown) may be used to connect various modules in the different switch fabric stages. For example, cables may be used to connect module 111 to modules 112, 122, 132, and 142. The cables may be connected to the modules via, for example, connectors (not shown) on the front panels.

The system controller 220 may comprise a processor with suitable software to allow control and/or monitoring of various equipment such as the cabinet 200 and modules plugged in to the cabinet 200. The system controller 220 may be used to enable or disable specific modules or portions of modules. The system controller 220 may also be used to configure a network. Configuring a network may comprise, for example, entering into a database communication paths that a particular switching module may be connected to.

Figure 3:
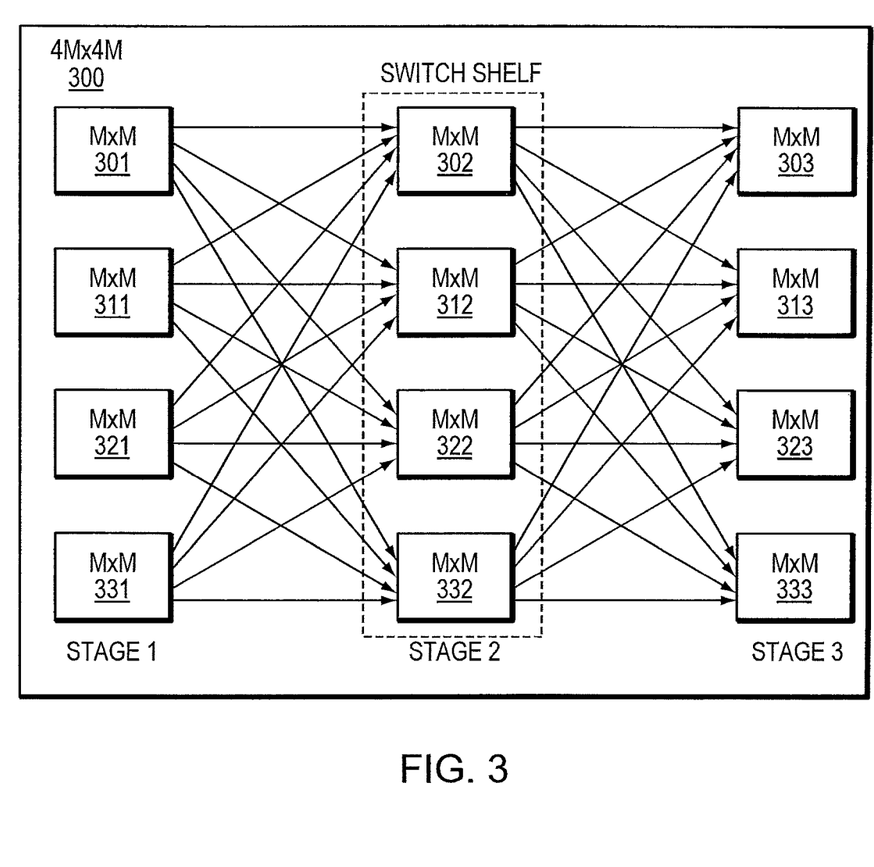
FIG. 3 illustrates an exemplary block diagram of a switch as implemented on different types of shelves that may be used in accordance with an embodiment of the invention.

FIG. 3 illustrates an exemplary block diagram of a switch as implemented on different types of shelves that may be used in accordance with an embodiment of the invention. Referring to FIG. 3, there is shown a switch 300 comprising a plurality of switching modules 301, 302, 303, 311, 312, 313, 321, 322, 323, 331, 332, and 333. The switch 300 is a 4M×4M switch with 4M inputs and 4M outputs, where any of the inputs may be connected to any of the outputs. The switching modules shown in this figure may be similar to the switching modules shown in FIG. 1. Additionally, while switching modules described below are referred to as a M×M module, a switching module of M×N configuration may also be used where M is a different number than N. In this example, each switching module 301, 302, . . . , 332, 333 may be a M×M switching module. The switching modules 301, 311, 321, and 331 in stage 1 may be provisioned such that they may be on one or more shelves of a cabinet, such as, for example, the cabinet 200. For example, the switching modules 301, 311, 321, and 331 may be in slot A of shelves 202, 204, 206, and 208, respectively. Similarly, the switching modules 303, 313, 323, and 333 may be in slot B of shelves 202, 204, 206, and 208, respectively. The switching modules 302, 312, 322, and 332 may be provisioned, for example, in slots A, C, E, and G, respectively, in the shelf 210.

The switching modules may also be provisioned in other configurations depending on cabinet/shelf specific characteristics, or process followed by a particular service provider. For example, the M×M switching modules in stages 1 and 3 may be provisioned in slots A, B, C, and D in shelves 206 and 208, respectively, or in slots A, C, E, and G in shelves 206 and 208, respectively. The switching modules in stages 1 and 3 may also be provisioned on the same shelf, or all switching modules that can fit on a shelf may be put on the same shelf.

Additionally, while various figures, including FIG. 3, depict uni-directional signal transfer with respect to various stages, it should be noted that this is done for clarity of a particular set of signal flow. The various figures shown may depict logical view of modules in a switch. Furthermore, various embodiments of the invention may be used for switching different types of signals and used with different standards such as, for example, SONET/SDH, packet, OTN, and layer 0.

Figure 4:
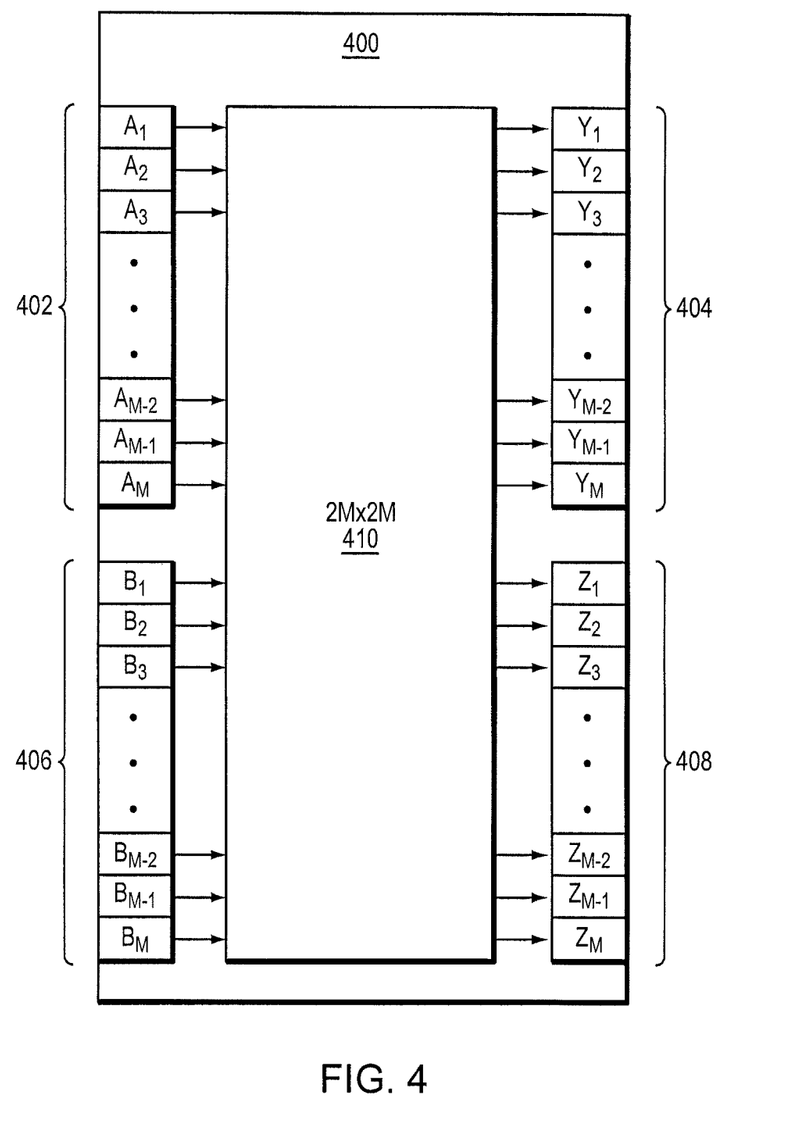
FIG. 4 illustrates an exemplary block diagram of a switching module in accordance with an embodiment of the invention.

FIG. 4 illustrates an exemplary block diagram of a switching module in accordance with an embodiment of the invention. Referring to FIG. 4, there is shown an exemplary switching module 400 that may be used to grow capacity of a switch with minimal, if any, disruption to existing traffic. The switching module 400 comprises input ports 402 and 406 and output ports 404 and 408. In an embodiment of the invention, connectors for the M input ports 402 and the M output ports 404 may be located on the front panel, while the M input ports 406 and the M output ports 408 may be accessed via a backplane. The switching module 400 also comprises switch element 410.

In operation, the input signals received via the 2M input ports 402 and 406 may be communicated to the switch element 410. The switch element 410 may then switch any of the 2M input signals to any of the 2M output ports 404 and 408. However, the switching capacity may be limited by the number of ports accessible via a front panel of the switching module 400. For example, if a service provider provisions the switching module 400 to only switch input signals received via the input ports 402 and output those switched signals via the output ports 404, the switching module may effectively be a M×M switching module. A special case of the switching capability by the switch element 410 may be statically switching the M input ports 402 to the M output ports 408, and the M input ports 406 the M output ports 404. This may be referred to as layer 0 forwarding mode for the switch element 410.

The cables communicating input signals to the input ports 402 may vary depending on the type of I/O interface used by the switching module 400. For example, the cables may be optical cables if the input ports 402 are designed to receive optical signals, or electrical cables if the input ports 402 are designed to receive electrical signals. Similarly, cables used to transmit signals output via the output ports 404 may also depend on the type of I/O interface used by the switching module 400. Additionally, while a backplane typically conducts electrical signals, the invention may also comprise connection to a backplane that uses other types of signals such as, for example, optical signals.

The particular process of growing switch capacity will be discussed further with respect to FIGS. 5-8.

Figure 5:
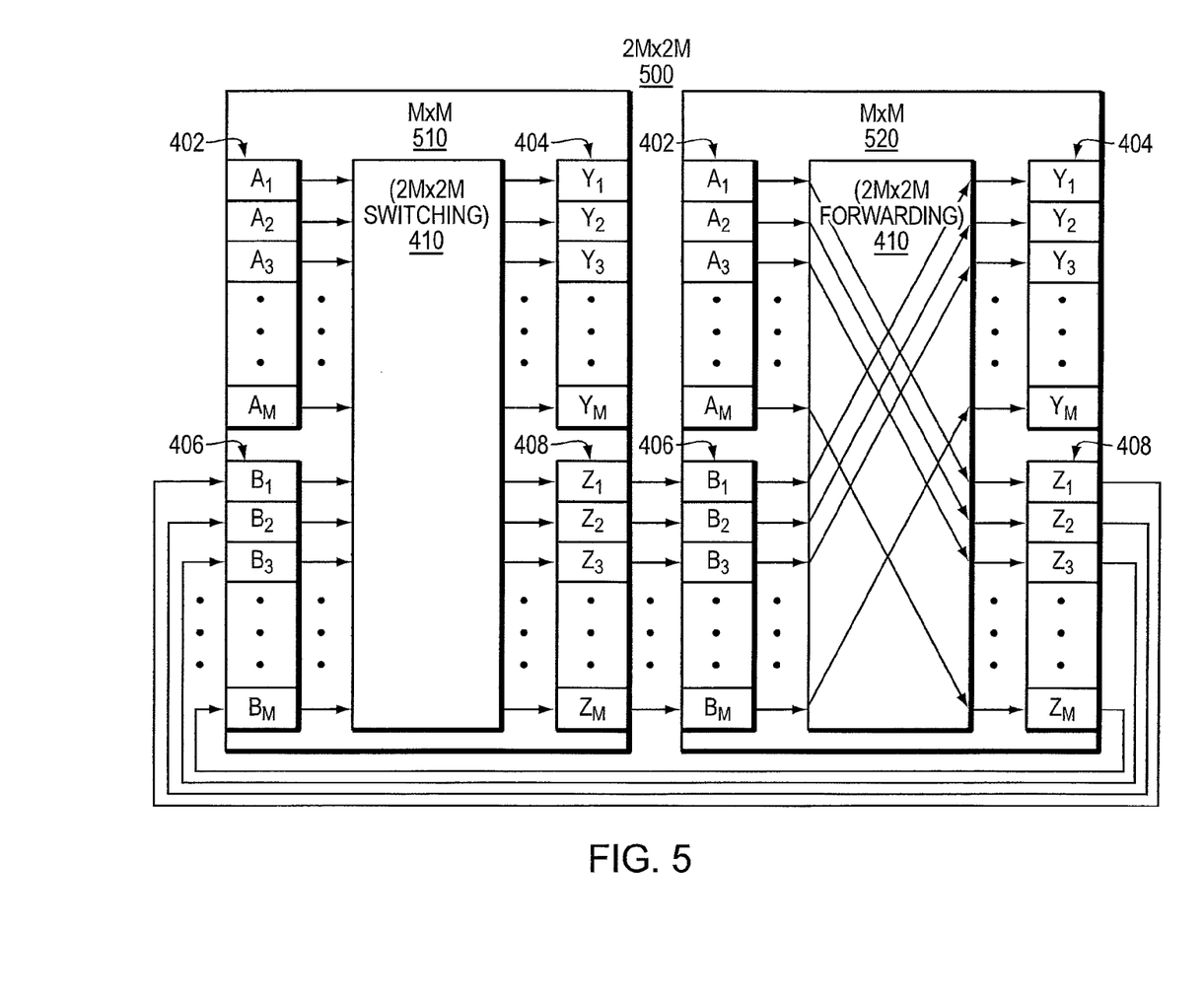
FIG. 5 illustrates an exemplary block diagram for configuring a pair of switching modules in accordance with an embodiment of the invention.

FIG. 5 illustrates an exemplary block diagram for configuring a pair of switching modules in accordance with an embodiment of the invention. Referring to FIG. 5, there is shown a pair of switching modules 510 and 520 with capability to form a 2M×2M switch 500. The switching modules 510 and 520 are similar to the switching module 400. Although each of the switching modules 510 and 520 has capability to perform 2M×2M switching, an implementation bottleneck may be the number of connectors available via the front panel in cases where connections external to the switch 500 is via connectors on the front panel of a module, such as the switching modules 510 and 520. Accordingly, the switching module 510 or 520, although capable of 2M×2M switching, may be used for M×M switching when used by itself. As traffic increases, a second switching module may be installed to allow 2M×2M switching of input signals communicated to the switching modules 510 and 520 via the front panel input ports.

A scenario that will be described is where the switching module 510 was initially in place, and the switching module 520 is added to increase switching capacity. Accordingly, the input ports 402 of the switching module 510 may be connected to cables via connectors on the front panel of the switching module 510. Similarly, the output ports 404 of the switching module 510 may be connected to cables via connectors on the front panel of the switching module 510. The switching element 410 in the switching module 510 may then be configured to switch appropriate input ports 402 to appropriate output ports 404.

The switching module 520 may then be paired with the switching module 510. Cables may be connected to the input ports 402 of the switching module 520 via connectors on the front panel of the switching module 520. Similarly, the output ports 404 of the switching module 520 may be connected to cables via connectors on the front panel of the switching module 520.

The output ports 408 of the switching module 520 may be coupled to the input ports 406 of the switching module 510. This coupling may take place via a backplane into which the switching modules 510 and 520 are inserted. The output ports 408 of the switching module 510 may be coupled, for example, via a backplane to the input ports 406 of the switching module 520.

The switching module 520 may then be configured in the layer 0 forwarding mode for the switch element 410. The switching module 510 may then be configured to appropriately switch the M front panel inputs at the input ports 402 and the M backplane inputs at the input ports 406 to the M front panel output ports 404 and the M backplane output ports 408. Accordingly, all inputs and outputs to cables will be through the front panel input ports and front panel output ports. This will thereby minimize disruption, if there is any disruption at all, to the signals being presently switched by the switching module 510 to the brief period when the switching module 510 is cut over from M×M switching to 2M×2M switching. The switching module 510 may be referred to as an enhanced switching module and the switching module 520 may be referred to as a forwarding module.

Accordingly, it may be seen that the signals that are switched by the switching module 510 are the signals received via the input ports 402 in the switching module 510 and the signals received from the switching module 520 via the input ports 406 in the switching module 510. The signals received by the input ports 406 in the switching module 510 may be signals received via the input ports 402 in the switching module 520, which are then forwarded to the output ports 408 in the switching module 520, and then communicated to the input ports 406 in the switching module 510. The switched signals communicated to the output ports 408 in the switching module 510 may be communicated to the input ports 406 in the switching module 520, where the signals may then be forwarded to the output ports 404 in the switching module 520.

Additionally, in cases where the switching module 520 provides later generation technology such as, for example, faster signal rate supported for the M input ports 402, faster switching capability, etc., the switching module 520 may be used for switching and the switching module 510 may be used for layer 0 forwarding functionality. A process for performing this may be by connecting cables as described above to the switching module 520, and then the backplane interconnections as described above between the switching modules 510 and 520.

The switching module 520 may then be provisioned to perform 2M×2M switching and the switching module 510 may be provisioned in layer 0 forwarding mode. Accordingly, the faster switch element 410 in the switching module 520 may perform switching for the previously set up input signals to the switching module 510 as well as the newly set up input signals to the switching module 520 with minimal disruption to the previously set up input signals to the switching module 510. It may be noted that growing switch capacity as described above does not require disconnecting existing cables nor removal of old equipment. In this case, the switching module 520 may be referred to as the enhanced switching module and the switching module 510 may be referred to as the forwarding module.

Figure 6:
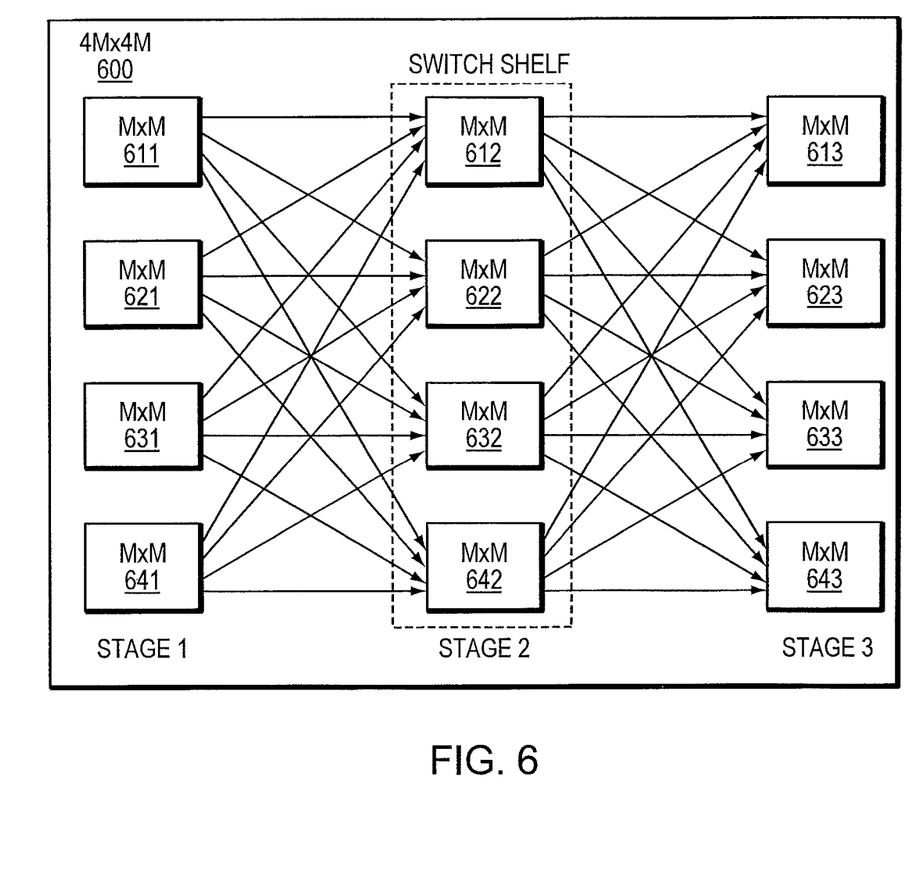
FIG. 6 illustrates an exemplary block diagram of a switch implemented for growth of a switch fabric in accordance with an embodiment of the invention.

FIG. 6 illustrates an exemplary block diagram of a switch implemented for growth of a switch fabric in accordance with an embodiment of the invention. Referring to FIG. 6, there is shown a 4M×4M switch 600 comprising four input switching modules 611, 621, 631, and 641 in stage 1 and four output switching modules 613, 623, 633, and 643 in stage 3. The center stage 2 may comprise four M×M switching modules 612, 622, 632, and 642, where each switching module may be similar to the switching module 400. The stages 1 and 3 switching modules may be provisioned in, for example, slots A and B on shelves 202, 204, 206, and 208 as described with respect to FIG. 2. The M×M switching modules in stage 2 may be provisioned in, for example, slots A, C, E, and G of the shelf 210 as described with respect to FIG. 2.

The M×M switching modules 612, 622, 632, and 642 in stage 2 may enable future growth of the switch 600 with minimal disruption to the signals on the cables already connected to the input ports of the input switching modules 611, 621, 631, and 641, and to the output ports of the output switching modules 613, 623, 633, and 643.

Figure 7:
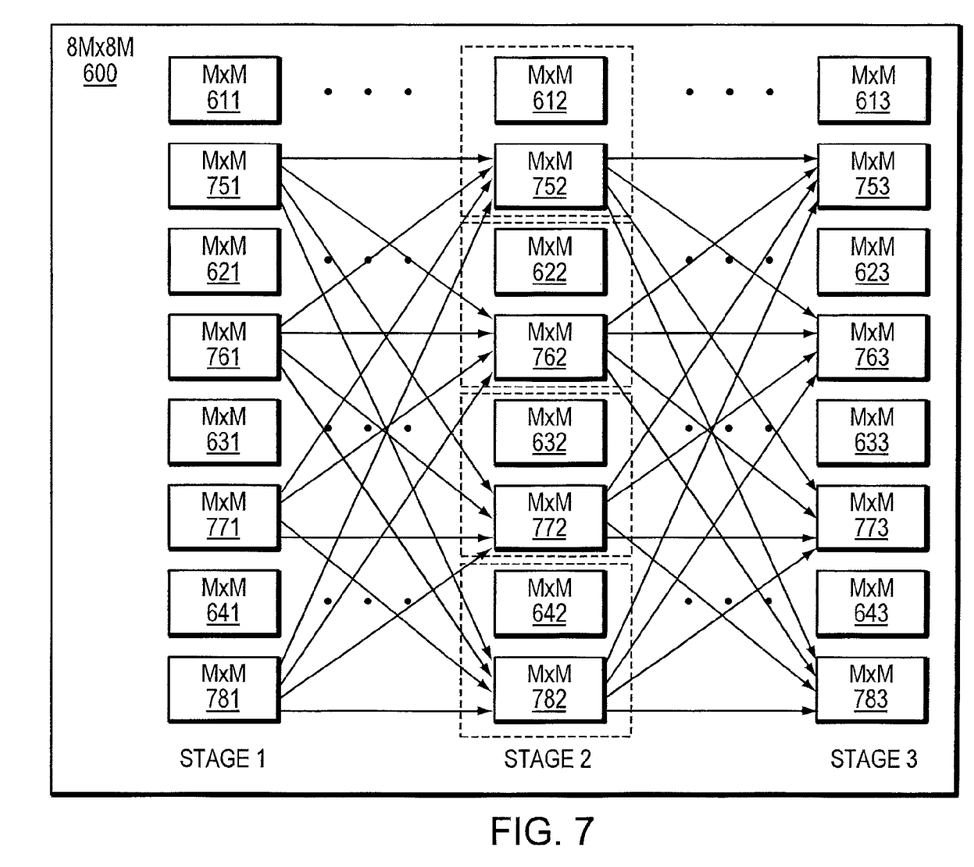
FIG. 7 illustrates an exemplary block diagram of a switch with increased capacity in accordance with an embodiment of the invention.

FIG. 7 illustrates an exemplary block diagram of a switch with increased capacity in accordance with an embodiment of the invention. Referring to FIG. 7, there is shown the switch 600 where additional switching modules have been added to stages 1, 2, and 3. In order to grow the capacity of the switch 600, additional M×M switching modules 752, 762, 772, and 782 are added to stage 2, where each switching module is similar to the switching module 400. Also, additional M×M switching modules 751, 761, 771, and 781 are added to stage 1 and additional M×M switching modules 753, 763, 773, and 783 are added to stage 3. It may be noted that the switching modules 752, 762, 772, and 782 may comprise a later generation technology than the switching modules 612, 622, 632, and 642.

Although not shown, the connections between the stage 1 switching modules 611, 621, 631, and 641 and the stage 2 switching modules 612, 622, 632, and 642 still exist and have not changed compared to FIG. 6. Similarly, the connections between the stage 2 switching modules 612, 622, 632, and 642 and the stage 3 switching modules 613, 623, 633, and 643 still exist and have not changed compared to FIG. 6.

Stage 2 switching modules 612, 622, 632, 642, 752, 762, 772, and 782 and may be paired as described with respect to FIG. 5. For example, switching modules 612 and 752 may be paired together to form an effectively 2M×2M switching module, switching modules 622 and 762 may be paired together to form an effectively 2M×2M switching module, switching modules 632 and 772 may be paired together to form an effectively 2M×2M switching module, and switching modules 642 and 782 may be paired together to form an effectively 2M×2M switching module. After appropriate cable connections are made to the switching modules 752, 762, 772, and 782, the switch 600 may operate as a 8M×8M switch with at least twice the signal throughput as the previous 4M×4M switching mode. Any additional throughput more than by a factor of 2 may be due to the later generation technology in the stage 2 switching modules 752, 762, 772, and 782 allowing handling of faster input signals.

While a specific configuration was described for exemplary purposes, the invention need not be so limited. For example, the switch 600 may be expanded with the switching modules 752, 762, 772, and/or 782 to take advantage of new technology even if the switch 600 is not fully grown to a 4M×4M switch. Additionally, the switch 600 may be provisioned such that it incrementally grows to a bM×bM switch, where 'b' is greater than 4 and less than 8 by adding the switching modules 751, 761, 771, 781, 753, 763, 773, and/or 783 as needed. Furthermore, while the switch 600 has been described as having equal number of input ports and output ports (4M×4M or 8M×8M or bM×bM), the invention need not be so limited. The switch 600, whether before or after growth, may generally be described as cM×dM, where 'c' may or may not be equal to 'd.'

Figure 8:
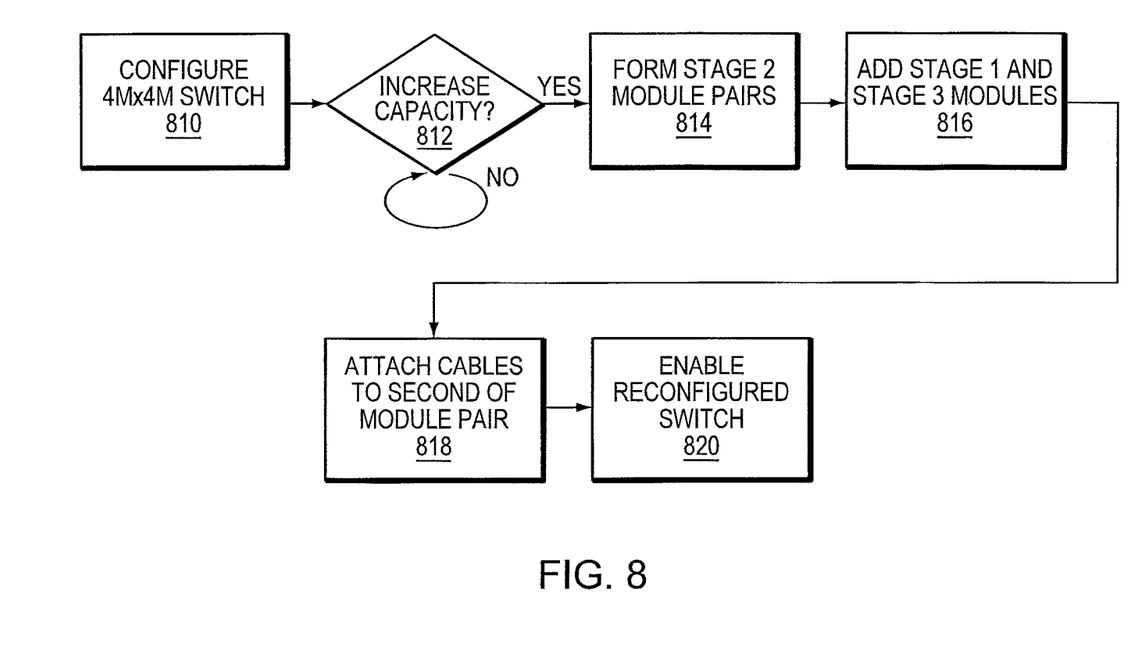
FIG. 8 illustrates a flow diagram for increasing switch capacity in accordance with an embodiment of the invention.

FIG. 8 illustrates a flow diagram for increasing switch capacity in accordance with an embodiment of the invention. A simplified switch configuration is assumed in this description for the sake of clarity in description. However, as explained previously, various embodiments of the invention need not be limited to a number of stages of a switch or to any specific number of ports on the input or output of the switch. In FIG. 8 a 3-stage Clos switch is assumed to grow from a 4M×4M configuration to 8M×8M configuration for this exemplary case. However, it should be noted that growth may be to a number of inputs and/or outputs that is less than to 8M×8M configuration. Referring to FIG. 8, as shown in 810, a 3-stage switch such as the switch 600 may be initially configured using switching modules such as, for example, the switching modules 400, for stage 2. Stage 1 and stage 3 switching modules may be, for example, M×M switching modules.

If capacity of the 3-stage switch, such as the switch 600, is to be increased, then switching modules may need to be added to the multi-stage switch. As seen in 814, additional switching modules may need to be added to stage 2 so as to form switching module pairs. While a backplane may be preconfigured for appropriately pairing the stage 2 switching modules, if needed, appropriate backplane connections may be made between each module pair. One of the two switching modules in each stage 2 switching module pair may be configured for 2M switching, and the other of the switching module pair may be configured for layer 0 signal forwarding. While pairing of stage 2 switching modules may occur to increase switching capacity, the invention need not be so limited. For example, an older technology stage 2 switching module may be paired with a newer technology stage 2 switching module in order to take advantage of the newer technology without having to disrupt service by removing cables and/or switching modules. Additionally, as seen in 816, additional switching modules may need to be added to stages 1 and 3 to increase the number of input ports and output ports, respectively, for the 3-stage switch.

As seen in 818, input and output cables may be coupled to connectors on the front panel of the additional stage 2 switching modules added in 814. While selection of a specific switching module, in the stage 2 module pair, for 2M switching or layer 0 signal forwarding may be situation dependent, generally a faster switching module may be selected for switching.

As seen in 820, the 3-stage switch may operate as large as an 8M×8M switch by appropriately adding switching modules in stage 2 and incrementally adding switching modules in stages 1 and 3.

Embodiments of the present invention may be provided as a computer program product, or software, that may include a computer readable medium or machine readable medium having instructions. The instructions on the computer readable or machine readable medium may be used to program a computer system or other electronic device. The medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer readable medium" or "machine readable medium" used herein shall include any medium that is capable of storing or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed:

1. A module for processing signals, comprising:
   first input ports of a first switch element accessible via a module front panel;
   first output ports of the first switch element accessible via the module front panel;
   second input ports of the first switch element accessible via connections on the module other than connections on the module front panel;
   second output ports of the first switch element accessible via connection on the module other than connections on the module front panel; and
   the first switch element configured to switch signals received by the first input ports and the second input ports to the first output ports and the second output ports;
   the module further comprising at least one second switch element forming a pair with the first switch element, the pair formed without modifying one or more connections to at least one of the first input ports and the first output ports of the first switch element, the module providing an aggregate switching capacity for a combination of the first switch element and the at least one second switch element, the aggregate switching capacity being increased at least with respect to a number of ports of one or more of the first switch element and the at least one second switch element as compared with a switching capacity of one of the first switch element and the at least one second switch element, the first switch element and the at least one second switch element enabled to be paired, via connection between the second input ports of the first switch element and the second output ports of the at least one second switch element, and via connection between the second output ports of the first switch element and the second input ports of the at least one second switch element.

2. The module according to claim 1, wherein a number of the first input ports of the one or more of the first switch element and the at least one second switch element is the same as a number of the second output ports of the one or more of the first switch element and the at least one second switch element.

3. The module according to claim 1, wherein a number of the first input ports of the one or more of the first switch element and the at least one second switch element is fewer than a number of second output ports of the one or more of the first switch element and the at least one second switch element.

4. The module according to claim 1, wherein the first switch element comprises suitable circuitry to switch a number of inputs that is twice a number of the first input ports of the first switch element.

5. The module according to claim 1, wherein the second input ports of the one or more of the first switch element and the at least one second switch element and the second output ports of the one or more of the first switch element and the at least one second switch element are accessible via a backplane into which the module is inserted.

6. The module according to claim 1, wherein three or more ports of the second input ports of the one or more of the first switch element and the at least one second switch element are accessible via connections on the module other than connections on the module front panel.

7. The module according to claim 1, wherein the at least one second switch element is configured to switch signals received by the first input ports and the second input ports of the one or more of the first switch element and the at least one second switch element to the first output ports and the second output ports of the one or more of the first switch element and the at least one second switch element.

8. The module according to claim 1, wherein the aggregate switching capacity is increased based upon the at least one second switch element providing at least one additional port to the pair as compared with at least one of the first input ports, the second input ports, the first output ports, and the second output ports of the first switch element.

9. A multi-stage switch, comprising:
   first switching modules enabled to communicate with second switching modules; and
   third switching modules enabled to communicate with the second switching modules,
   wherein each of the second switching modules is enabled to be paired, without modifying one or more connections to at least one of first input ports and first output ports of each of the second switching modules, with another second switching module via the first input ports and the first output ports of each of the pair of the second switching modules and a given second switching module of the second switching modules is enabled to be paired with the another second switching module via connection between second output ports of the another second switching module and second input ports of the given second switching module and via connection between second output ports of the given second switching module and second input ports of the another second switching module, and, when paired, one of the pair of the second switching modules is configured to be an enhanced switching module that switches input signals received via its first input ports and its second input ports to its first output ports and its second output ports, and the other of the pair of the second switching modules is configured to be a forwarding module that communicates input signals received via its first input ports to its second output ports and communicates input signals received via its second input ports to its first output ports, the multi-stage switch providing an aggregate switching capacity that is increased at least with respect to a number of ports of one or more of the given second switching module and the another second switching module as compared with a switching capacity of one of the first switching modules, the second switching modules, and the third switching modules.

10. The multi-stage switch according to claim 9, wherein, for each of the second switching modules, a number of the second input ports is the same as a number of the first output ports.

11. The multi-stage switch according to claim 9, wherein for each of the second switching modules, a number of the second input ports is less than a number of the first output ports.

12. The multi-stage switch according to claim 9, wherein each of the second switching modules are inserted into a backplane and each of the second switching modules are paired by coupling, to allow communication via the backplane.

13. The multi-stage switch according to claim 9, wherein, prior to pairing, each of the second switching module switches signals received via its second input ports to its second output ports.

14. The multi-stage switch according to claim 9, wherein the given second switching module is further enabled to be paired with the another second switching module following installation of the given second switching module.

15. A method for configuring switching modules, comprising:
coupling second output ports of a first switching module with second input ports of a second switching module to allow communication from the first switching module to the second switching module;
coupling second output ports of the second switching module with second input ports of the first switching module to allow communication from the second switching module to the first switching module;
configuring one of the first switching module and the second switching module as a forwarding module;
configuring other of the first switching module and the second switching module as an enhanced switching module;
providing an aggregate switching capacity in the enhanced switching module that is increased at least with respect to a number of ports of one or more of the first switching module and the second switching module as compared with a switching capacity of one of the first switching module and the second switching module, the increased aggregate switching capacity being provided without modifying one or more connections to at least one of first input ports and first output ports of the first switching module; and
wherein the enhanced switching module switches signals from its first input ports and its second input ports to its first output ports and its second output ports, and the forwarding module communicates signals from its second input ports to its first output ports and communicates signals from its first input ports to its second output ports.

16. The method according to claim 15, wherein, prior to being coupled with the second switching module, the first switching module is configured to switch first input signals from its second input ports to second output ports as first output signals.

17. The method according to claim 16, wherein the forwarding module is configured to receive second input signals via its second input ports and transmit second output signals via its second output ports.

18. The method according to claim 17, wherein the enhanced switching module switches the first input signals and third input signals, wherein the third input signals are communicated to the first input ports of the enhanced switching module via the first output ports of the forwarding module.

19. The method according to claim 18, wherein the enhanced switching module outputs the switched signals to its first output ports and to its second output ports.

20. The method according to claim 18, wherein the forwarding module outputs the switched signals to its first output ports and to its second output ports.

21. The method according to claim 17, wherein the forwarding module switches the second input signals and fourth input signals, wherein the fourth input signals are communicated to the first input ports of the forwarding module via the first output ports of the enhanced switching module.

22. A method for configuring a switch, comprising:
pairing, in a stage of a multi-stage switch, a first switching module with a second switching module by coupling second output ports of the first switching module with second input ports of the second switching module to allow communication of first output signals to the second switching module, and coupling second output ports of the second switching module with second input ports of the first switching module to allow communication of second output signals to the first switching module;
configuring one of the first switching module and the second switching module as a forwarding module;
configuring other of the first switching module and the second switching module as an enhanced switching module;
providing an aggregate switching capacity in the enhanced switching module that is increased at least with respect to a number of ports of one or more of the first switching module and the second switching module as compared with a switching capacity of one of the first switching module and the second switching module, the increased aggregate switching capacity being provided without modifying one or more connections to first input ports and first output ports of the first switching module; and
wherein the enhanced switching module switches signals from its first input ports and its second input ports to its first output ports and its second output ports, and the forwarding module communicates signals from its second input ports to its first output ports and communicates signals from its first input ports to its second output ports.

23. The method according to claim 22, wherein, prior to being coupled with the second switching module, the first switching module receives first input signals via its second input ports from at least one of an initial number of first stage communication modules, the first switching module is configured to switch the first input signals to its second output ports as third output signals, and the third output signals are communicated to at least one of an initial number of second stage communication modules.

24. The method according to claim 23, comprising communicating additional signals from the first stage communication modules to the second input ports of the second switching module.

25. The method according to claim 24, comprising providing the additional signals by increasing the initial number of the first stage communication modules.

26. The method according to claim 23, comprising communicating additional signals from the second output ports of the second switching module to the second stage communication modules.

27. The method according to claim 26, wherein the additional signals are communicated to additional second stage communication modules added to increase the initial number of the second stage communication modules.

28. The method according to claim 11, further comprising pairing the first switching module with the second switching module following installation of the first switching module.

* * * * *